US005949203A

United States Patent [19]
Büthker

[11] Patent Number: 5,949,203
[45] Date of Patent: Sep. 7, 1999

[54] ARRANGEMENT FOR GENERATING DRIVE SIGNALS FOR A MULTI-PHASE D.C. MOTOR, LOCK DETECTOR, DRIVE ARRANGEMENT AND DISK DRIVE

[75] Inventor: Henricus C. J. Büthker, Mierlo, Netherlands

[73] Assignee: U.S. Philips Corporation, New York, N.Y.

[21] Appl. No.: 08/976,806

[22] Filed: Nov. 24, 1997

[30] Foreign Application Priority Data

Dec. 3, 1996 [EP] European Pat. Off. ............... 96203418

[51] Int. Cl.[6] ..................................................... H02P 11/18
[52] U.S. Cl. ............................................................ 318/254
[58] Field of Search .................................... 318/145, 254, 318/376, 377, 500; 331/4

[56] References Cited

U.S. PATENT DOCUMENTS 4,724,402  2/1988  Ireland ........................................ 331/4
4,928,043  5/1990  Plunkett .................................. 318/254

FOREIGN PATENT DOCUMENTS

0558261A1  2/1993  European Pat. Off. .......... H02P 6/02

Primary Examiner—William M. Shoop, Jr.
Assistant Examiner—Rina I. Duda
Attorney, Agent, or Firm—Bernard Franzblau

[57] ABSTRACT

An arrangement for generating drive signals for a multi-phase d.c. motor having a plurality of windings, comprising a multi-phase inverter (10) which supplies the drive signals to the windings of the motor in a manner such that the windings are recurrently energized by the drive signals in a given sequence. At least one of the windings is not supplied with a drive signal at least during predetermined free periods. A phase detector (40) which, under control of the multi-phase inverter, samples the back-emf signals of these windings in order to obtain a phase-error signal. A low-pass filter (42) generates a control signal dependence upon the phase-error signal, and a controllable oscillator (44) generates a frequency signal whose frequency depends on the control signal. The timing of the multi-phase inverter drive signals supplied to the motor windings depends on the frequency signal. A phase-locked loop is formed by the multi-phase inverter, the phase detector, the low-pass filter and the oscillator. A lock detector (70) which, on the basis of information about the frequency and phase of the phase-error signal and information about the frequency and phase of the frequency signal, determines whether or not the phase-locked loop is locked in phase.

22 Claims, 7 Drawing Sheets

| F | van | naar | FC | A | B | C |
|---|---|---|---|---|---|---|
| 1 | A | B | C | Pa | Pa | Pv |
| 2 | A | C | B | Pa | Pv | Pa |
| 3 | B | C | A | Pv | Pa | Pa |
| 4 | B | A | C | Pa | Pa | Pv |
| 5 | C | A | B | Pa | Pv | Pa |
| 6 | C | B | A | Pv | Pa | Pa |

ARRANGEMENT FOR GENERATING DRIVE SIGNALS FOR A MULTI-PHASE D.C. MOTOR, LOCK DETECTOR, DRIVE ARRANGEMENT AND DISK DRIVE

BACKGROUND OF THE INVENTION

This invention relates to an arrangement for generating drive signals to be supplied to a plurality of windings of a multi-phase d.c. motor, comprising a multi-phase inverter which supplies the drive signals to the windings of the motor in such a manner that these windings are recurrently energized by the drive signals in a given sequence, at least one winding not being supplied with a drive signal at least during predetermined free periods; a phase detector which, under control of said multi-phase inverter, during a plurality of said free periods in which no drive signal is applied to said windings, multiplexes the back-emf signals of these windings in order to obtain a phase-error signal; a first low-pass filter which generates a control signal dependent upon the phase-error signal; and a controllable oscillator which generates a frequency signal whose frequency depends on the control signal, the timing with which the multi-phase inverter supplies the drive signals to the windings being dependent on the frequency signal, the arrangement thus comprising a phase-locked loop formed by the multi-phase inverter, phase detector, first low-pass filter and oscillator.

The invention also relates to a lock detector for use in such an arrangement, to a drive arrangement comprising a multi-phase d.c. motor and such an arrangement, and to a system for storing and/or reproducing information on/from an information carrier and including such a drive system.

Brushless d.c. motors driven by an inverter generally use a feedback loop to maintain a desired phase-angle relationship between the position of the rotor and the stator at the instant that a winding is energized. The phase-angle relationship may be selected, for example, in such a manner that the motor produces a maximal torque.

A free period of a winding generally occurs within or coincides with a drive period of another winding, in which this other winding receives drive signals. The beginning and the end of a free period of a winding generally also coincide with the beginning or the end of a drive period of other windings. In the case of, for example, a three-phase motor this means that at any instant a drive signal is applied to two windings (during two drive periods which are 120° phase-shifted relative to one another), while no drive signal is applied to a third winding (during a free period which is half as long as each drive period). This third winding is kept "floating" and generates a back-emf signal, known per se.

Such an arrangement is known from U.S. Pat. No. 4,928,043. This known arrangement includes a feedback loop comprising the phase detector, the low-pass filter and the controllable oscillator. This feedback loop is consequently a phase-locked loop (PLL). The phase detector combines the successive back-emf signals from one or more windings to form the phase error signal, in which all back-emf signals are given the same polarity. The low-pass filter is constructed as an integrator which compares the back-emf voltages of a winding with a reference value and integrates the difference in order to obtain a control signal for the oscillator. The control signal controls the oscillator of the VCO type, which in its turn controls the switching instants of the multi-phase converter. If the desired position of the rotor of the motor, which is determined by the inverter, deviates from the actual position of the rotor, the voltage of the control signal will change accordingly and will cause the VCO to correct the switching instants of the inverter so as to counteract the deviation. The voltage of the back-emf signal has an optimum for which the motor generates a maximal torque. By means of the PLL a deviation of this voltage results in a change of the control signal so as to counteract the deviation.

SUMMARY OF THE INVENTION

In the known arrangement the problem occurs that the drive signals applied to the motor do not always cause the motor to rotate in the correct direction. The motor then stalls or rotates in the opposite direction. It is an object of the invention to provide means enabling the incorrect operation of the arrangement as described above to be at least detected and, when desired, to be eliminated. To this end, an arrangement in accordance with the invention is characterized in that the arrangement further comprises a lock detector which determines whether the back-emf signals are or are not in phase with the frequency signal, which is effected on the basis of information about the frequency and phase of the phase-error signal and information about the frequency and phase of the frequency signal.

The invention is based on the recognition that said problems are caused by the fact that the back-emf signals are not in phase with the frequency signal and that, on the basis of information about the frequency and phase of the error signal and about the frequency and phase of the frequency signal it is possible to determine whether the back-emf signals and the frequency signal are locked in phase or whether the back-emf signals and the frequency signal are not locked in phase. If the back-emf signals and the frequency signal are not locked in phase this can mean that the back-emf signals are locked but not in phase (the frequency signal is then for example locked to a harmonic frequency of back-emf signals instead of to the fundamental frequency of the back-emf signals). Conversely, if the back-emf signals and the frequency signal are not locked in phase, this can also mean that there is no phase relationship at all between these signals. In the two last-mentioned cases situations can arise in which the motor stalls or rotates in a wrong direction. The lock detector can discriminate each of the two last-mentioned situations from the situation in which said signals are locked in phase.

As a matter of fact, the use of a lock detector for detecting the state of a single-phase-locked loop is known per se. For example, stereo decoders also utilize a lock detection, the lock detector then comprising a phase detector to which the phase error signal and a 90° phase-shifted VCO signal (frequency signal) are applied. If the phase error signal is in phase with the VCO signal, the known lock detector supplies a direct voltage. If the phase-locked loop is not phase-locked the known lock detector supplies a voltage without a d.c. component. However, this concerns a known arrangement comprising a phase-locked loop and a lock detector, which phase-locked loop is of the single-phase type. In contrast, the invention relates to an arrangement comprising a multi-phase-locked loop formed by the multi-phase inverter, phase detector, first low-pass filter and oscillator. Indeed, the phase-error signal is composed of a plurality of back-emf signals of mutually different phase. This means that the lock detector detects the state of the multi-phase-lock-loop, i.e. it detects whether it is phase-locked, locked but not in phase, or not locked at all.

In a special embodiment of the arrangement the lock detector processes the phase-error signal and the frequency signal in combination in order to determine whether the back-emf signals are or are not in phase with the frequency signal. The advantage of this arrangement is that the phase-error signal and the frequency signal themselves, i.e. no derivatives of these signals, are processed in combination, as a result of which the arrangement remains simple. Preferably, the lock detector comprises means for multiplying the phase-error signal and the frequency signal by one another in order to obtain a lock signal. More particularly, the lock detector comprises means for alternately inverting and non-inverting the phase-error signal in the rhythm of the frequency signal in order to obtain a lock signal. If the lock signal thus obtained does not have a d.c. component this means that the phase-lock-loop is locked in phase. Conversely, if the lock signal has a d.c. component this means either that the phase-lock-loop is in lock while the back-emf signals and the frequency signal are not in phase or that the phase-lock-loop is not in lock, i.e. there is no phase relationship at all between the back-emf signals and the frequency signal.

In particular, the arrangement further comprises lock-signal-controlled means for, for example, re-starting the arrangement, generating an error signal, or increasing the bandwidth of the first low-pass filter when the lock signal represents the state in which the back-emf signals are not in phase with the frequency signal. This makes it possible to detect a stalling motor or a motor running in the reverse direction. By re-starting the arrangement or increasing the bandwidth of said filter the multi-phase-locked loop can assume a correctly locked state, as a result of which the motor will rotate in the desired mode.

The known arrangement with a phase-locked loop also has the problem that the motor does not operate correctly when it is started. In a special embodiment of the arrangement in accordance with the invention this problem is solved in that the arrangement further comprises a masking circuit for inhibiting the further processing of the phase-error signal by the first low-pass filter and/or the lock circuit temporarily, at least during the presence of a flyback pulse in the phase-error signal, thereby inhibiting the processing of the flyback pulses present in the phase-error signal.

The masking circuit thus eliminates the flyback pulses from the phase error signal, i.e. from the sampled back-emf signal applied to the first low-pass filter and/or the lock circuit. Preferably, the phase-error signal from which the flyback pulses have been eliminated is applied both to the first low-pass filter and to the lock circuit.

The flyback pulse appears after a commutation (switching instant of the inverter). The duration of a flyback pulse depends on the motor current and the self-induction effect. The duration of a flyback pulse is consequently long while the motor is started and at low speeds of the motor. Conversely, the back-emf signal is small while the motor is started and at low speeds of the motor. This means that, as a rule, the flyback pulses prevail over the back-emf signal. As a result of this, the correct operation of the first low-pass filter formed by an integrator and the lock detector will be disturbed. A deviating control signal means that commutation is not effected at the ideal instant. Since, in accordance with the invention, the flyback pulses have been eliminated, direct starting is possible by means of the multi-phase-lock-loop circuit. Moreover, this guarantees that commutation occurs at the ideal instant at any speed, i.e. also at low speeds and that also at low speeds the state of the multi-phase-lock-loop circuit can be determined by means of the lock detector.

BRIEF DESCRIPTION OF THE DRAWINGS

The invention will now be described in more detail with reference to the drawings. In the drawings.

DESCRIPTION OF THE PREFERRED EMBODIMENTS

Figure 1:
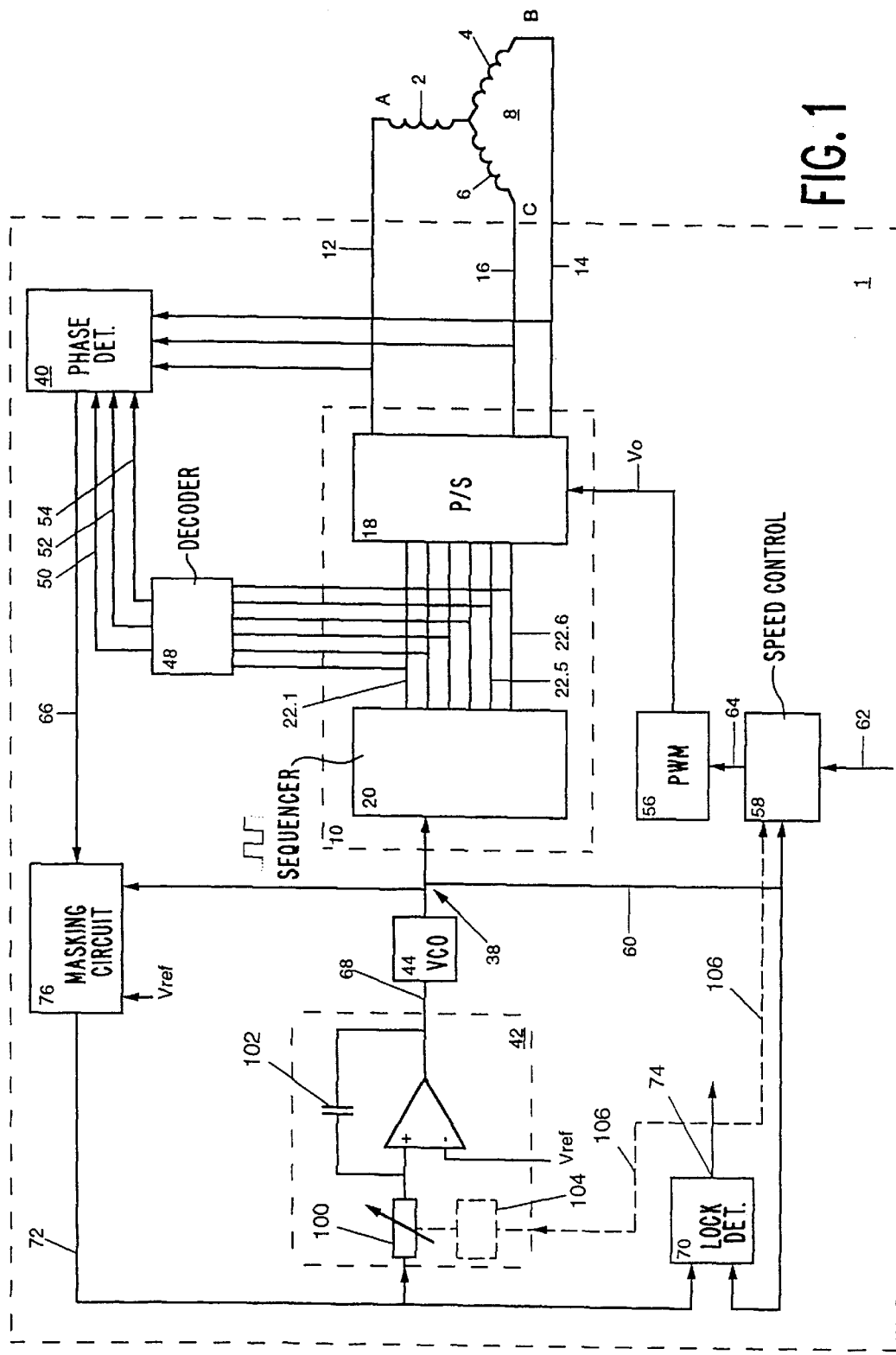
FIG. 1 shows a possible embodiment of an arrangement in accordance with the invention.

In FIG. 1 the reference numeral 1 denotes an arrangement for supplying drive signals to three windings 2, 4, 6 of a three-phase brushless d.c. motor 8. The windings of the stator of the motor are recurrently supplied with drive signals in a given sequence, in such a manner that the magnetic rotor of the motor is set into rotation, at least one winding not being supplied with drive signals during pre-determined free periods. In the present example all three windings recurrently but not simultaneously receive no drive signals in predetermined free periods. The arrangement 1 comprises a multi-phase inverter 10, known per se, for applying the drive signals to the windings 2, 4, 6 of the motor 8 in the above manner. The drive signals generated by the multi-phase inverter 10 are applied to the windings 2, 4, 6 of the motor 8 via lines 12, 14, 16.

Figures 2, 3:
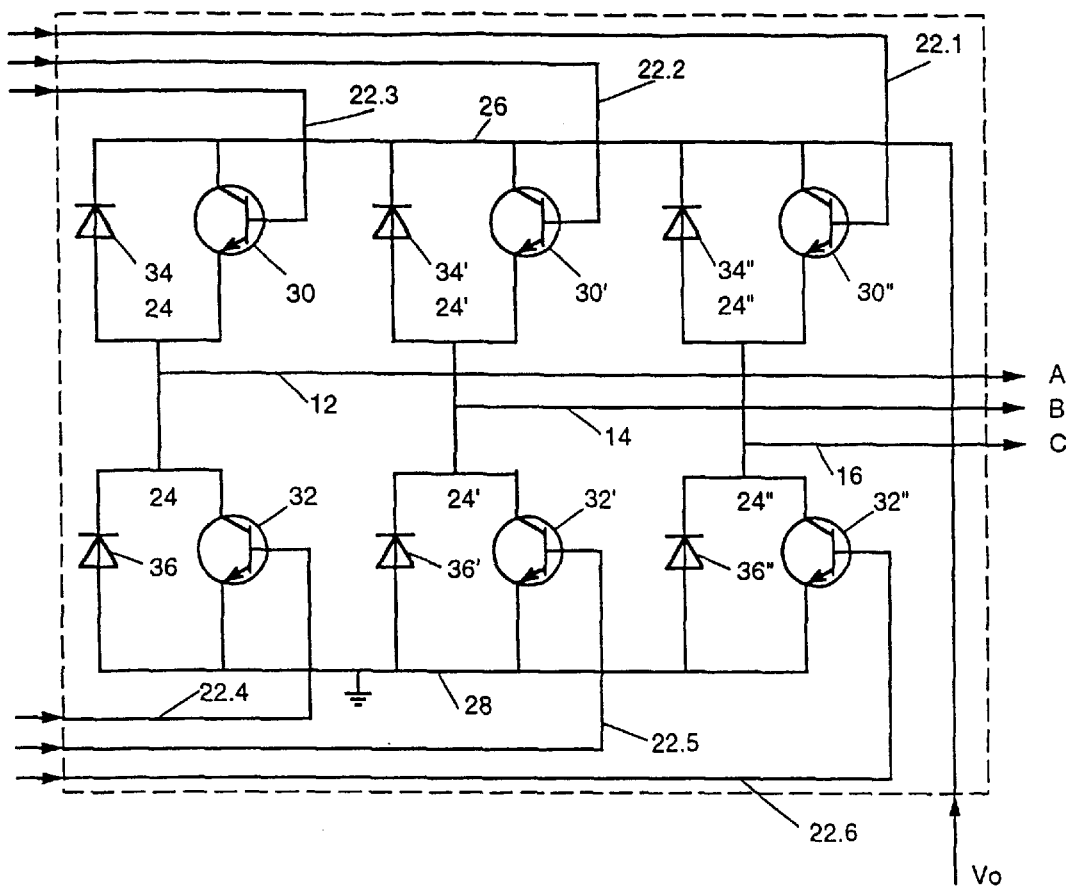
FIG. 2 shows an example of a power supply circuit of the arrangement shown in FIG. 1.
FIG. 3 is a table to illustrate the operation of the arrangement shown in FIG. 1.

In the present example the multi-phase inverter 10 is a three-phase inverter, because in this case a three-phase d.c. motor is to be driven. In this example the multi-phase inverter 10 comprises a power-supply circuit 18 and a sequencer 20. The sequencer 20 drives the power-supply circuit 18 sequentially via the lines 22.1–22.6 in such a manner that the power-supply circuit 18 supplies drive signals to the windings 2, 4, 6 in a sequential fashion, i.e. recurrently in a given sequence. FIG. 2 shows an example of the power-supply circuit 18. The power-supply circuit 18 comprises a conventional triple half-H-bridge. The power-supply circuit 18 comprises three series current paths 24, 24', 24" arranged between a power-supply line 26 and a zero-potential line 28. In the present example, a supply voltage $V_o$ is applied to the power-supply line 26 and the zero-potential line is connected to ground.

Each current path 24, 24', 24" comprises two series-connected transistors 30, 32; 30', 32; 30", 32'. The transistors 30, 30', 30" 32, 32', 32" may each comprise, for example, a FET known per se or any other switching means. Moreover, each transistor 30, 30', 30" 32, 32', 32" has an associated flyback diode 34, 34', 34", 36, 36', 36". Each flyback diode is arranged in antiparallel with the associated transistor. The flyback signals generated by a back-emf voltage produced in a winding during a free period of this winding can flow through the flyback diodes. The supply lines 12, 14, 16 are respectively connected to nodes A, B, C between the transistors 30, 32, 30', 32', 30", 32".

The operation of the power-supply circuit 18 will be described in more detail with reference to the table in FIG.

Figure 4:
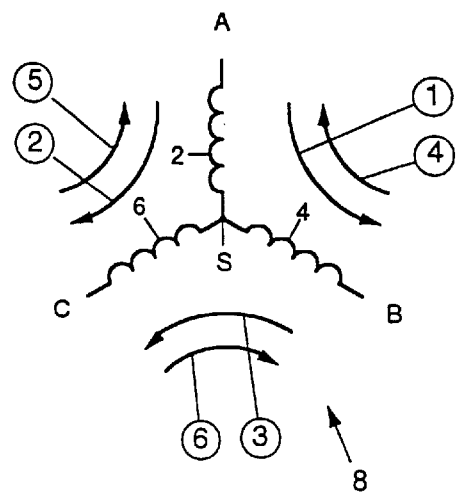
FIG. 4 shows diagrammatically drive signals successively applied to a motor by the arrangement shown in FIG. 1.

3 and with reference to FIG. 4, which shows the motor 8. The terminals of the windings 2, 4, 6 are shown as the nodes A, B and C in FIG. 4 and correspond to the nodes A, B and C in FIGS. 1 to 3. In general, it holds that in operation one node (for example, the node A) is connected to the power-supply line 26, another node (for example, the node B) is connected to the zero-potential line 28, and the last node (for example, the node C) is kept floating. Thus, six different phases are conceivable. For example, in a first phase F the power-supply circuit is controlled via the line 22.3 so as to turn on the transistor 30, thereby connecting the node A to the power-supply line 26. In the first phase F the transistor 32' is at the same time driven via the line 22.5 so as to connect the node B to the zero-potential line 28. The other transistors are turned off in the first phase F. As a result of this, a drive current is produced during the first phase F, which current flows from the power-supply line 26 to the node A via the transistor 30, from the node A to the node B via the windings 2 and 4, and from the node B to the line 28 via the transistor 32'. The node C then remains floating. The first phase is shown in FIG. 3 and FIG. 4. The first line of FIG. 3 shows that a current flows from the node A to the node B, while the node C is kept floating. In FIG. 4 this current is indicated by an arrow marked by an encircled reference numeral 1. In an entirely similar manner, a current flows in phase two from the node A to the node C, while the node B is kept floating. The other phases three to six, are shown in a similar way in FIG. 3 and FIG. 4. Moreover, a drive period $P_a$ can be defined in which drive signals are applied to a winding of a motor. A free period $P_v$ can be defined as a period in which no drive signal is applied to a winding. FIG. 3 also gives the drive period $P_a$ and the free period $P_v$. This Figure shows that drive signals are applied to the motor windings during given drive periods $P_a$ in such a manner that in the present example no drive signal is applied to one winding during drive periods $P_a$ of two windings. Moreover, the beginning and the end of a free period coincides with a beginning or an end of a drive period, each drive period being twice as long as one free period.

During the free period $P_v$, as stated hereinbefore, one of the nodes A, B or C is kept floating. However, if for example the node C is kept floating in the first phase, the rotation of the rotor of the motor will generate an induction voltage in the winding 6. This induction voltage is available between the node C and the star point S of the three windings and is referred to hereinafter as the back-emf signal. Likewise, a back-emf signal is generated between the node B and the star point S in the second phase F, and a back-emf signal between the node A and the star point S in the third phase F etc.

The sequencer 20 is of a generally known type and in the rhythm of a frequency signal to be defined hereinafter, which signal comprises a clock signal and is applied via a line 38, it generates on the lines 22.1–22.6 signals which recurrently turn on the power supply transistors 30, 30', 30", 32, 32', 32" in the sequence given in the Table of FIG. 3. The sequencer 20 may comprise, for example, a shift register, known per se, which is shifted through six times during one electrical revolution of the motor. In the present example, the clock signal on the line 38 therefore has a frequency which is a factor of six as high as the electrical rotation frequency of the rotor.

The above-mentioned back-emf signals, generated respectively in the windings 2, 4, 6, contain information about the actual position of the rotor of the motor. These signals can therefore be used for comparing an actual rotor position with a desired rotor position, so as to allow the actual rotor position to be corrected, if necessary. For this purpose, the arrangement includes a feedback loop comprising a phase detector 40, a low-pass filter 42 and a controllable oscillator 44. The back-emf signals, which are representative of the actual rotor position, are applied to the phase detector 40 via lines 12, 14, 16. By means of a decoder 48 to be described hereinafter, the desired rotor position can be derived from the output signals generated on the lines 22.1–22.6 by the sequencer 20 and corresponding signals are applied to the phase detector 40 via lines 50, 52, 54. In the present example, the controllable oscillator 44 is a VCO (Voltage Controlled Oscillator). The arrangement further comprises a pulse-width modulator 56, which generates a pulsating supply voltage $V_o$, which is applied to the power-supply circuit 18. The speed of the motor can be controlled by varying the pulse width of the supply voltage $V_o$. To this end, the arrangement comprises a speed controller 58, which controls the pulse-width modulator 56. The output signal of the oscillator 44 is a measure of the motor speed and is applied to the speed controller 58 via a line 60. The speed controller 58 compares the actual speed, represented by the signal on the line 60, with the desired speed, which is input to the speed controller 58, for example, via a line 62. If there is a difference between the desired speed input via the line 62 and the actual speed in accordance with the signal on the line 60, the speed controller 58 can control the pulse-width modulator 56 via the line 64 so as to reduce the speed difference to zero.

The use of pulse-width control to control the motor speed has the advantage that a high efficiency is attainable. The pulse-width modulation does give rise to spurious components on the back-emf signal. However, since said feedback loop is a multi-phase-locked loop (in the present example a three-phase-locked loop), these spurious components will not adversely affect the control of the instantaneous position of the rotor. The low-pass filter 42 removes the high-frequency spurious components caused by the pulse-width modulation. Thus, the multi-phase-locked loop maintains the desired phase-angle relationship between the position of the rotor and the stator, even when the speed of the motor is controlled by pulse-width modulation. Herein, a multi-phase-locked loop is to be understood to mean one feedback circuit which forms a phase-locked loop for each winding of the motor and which consequently feeds back a plurality of phase signals (back-emf signals).

The controllable oscillator 44 generates the aforementioned frequency signal comprising a clock signal and clocks the sequencer 20 via the line 38.

The arrangement further comprises a lock detector 70, to which information about the frequency and the phase of the frequency signal is applied via a line 60. Moreover, information about the frequency and the phase of the phase-error signal is applied to the lock detector 70 via the line 72. On the basis of this information the lock detector 70 determines whether or not the back-emf signals are in phase with the frequency signal, i.e. it determines whether the back-emf signals and the frequency signal are in phase, or whether there is an undesired phase relationship or no phase relationship between said signals. An undesired phase relationship occurs when the frequency signal is locked to a harmonic frequency instead of to the fundamental frequency of the back-emf signals. The multi-phase-locked loop is then in lock but not in phase. If there is no phase relationship at all, the multi-phase-locked loop is fully out of lock. Consequently, the lock detector determines the state of the multi-phase-locked loop, i.e. it determines whether it is phase-locked or not phase-locked.

In the present example, the phase-error signal and the frequency signal themselves are applied to the detector. The lock detector processes these signals in combination in order to determine said state of the multi-phase-locked loop. The lock detector generates a lock signal, to be described hereinafter, on the line 74, which signal is representative of this state of the multi-phase-locked loop. For this purpose, the lock detector may comprise means for multiplying the frequency signal and the phase-error signal by one another. The lock signal thus obtained is applied to the line 74 for further processing. In the present example the lock detector, as will be described hereinafter, comprises means for alternately inverting and non-inverting the phase-error signal in order to obtain the lock signal.

The operation of the arrangement and, particularly, of the feedback loop and the lock detector of the arrangement will be explained by means of the diagrams of FIGS. 5A and 5B.

Figure 5A:
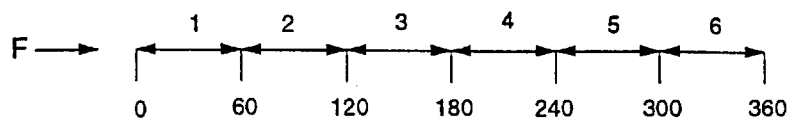
FIG. 5A shows waveform diagrams to illustrate the operation of the arrangement shown in FIG. 1.
Figure 5A:
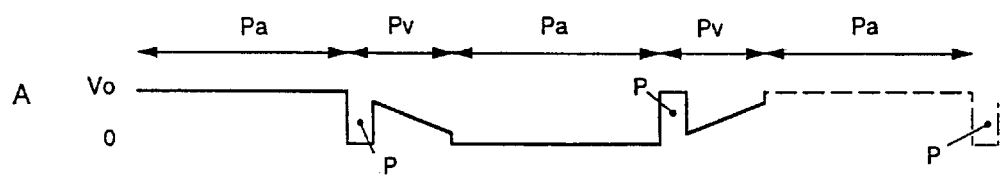
Figure 5A:
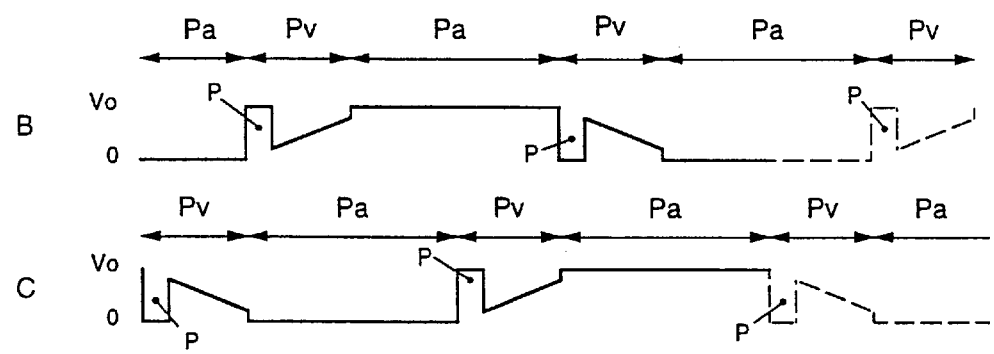
Figure 5A:
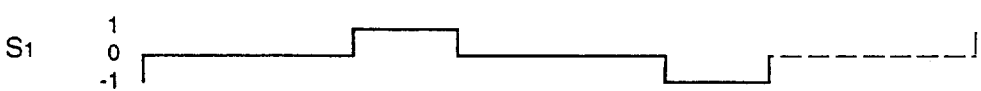
Figure 5A:
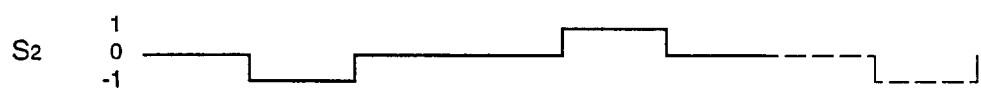
Figure 5A:
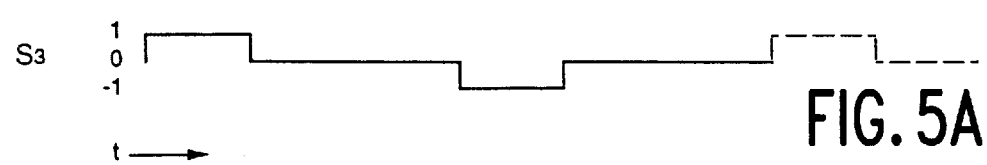
Figure 5B:
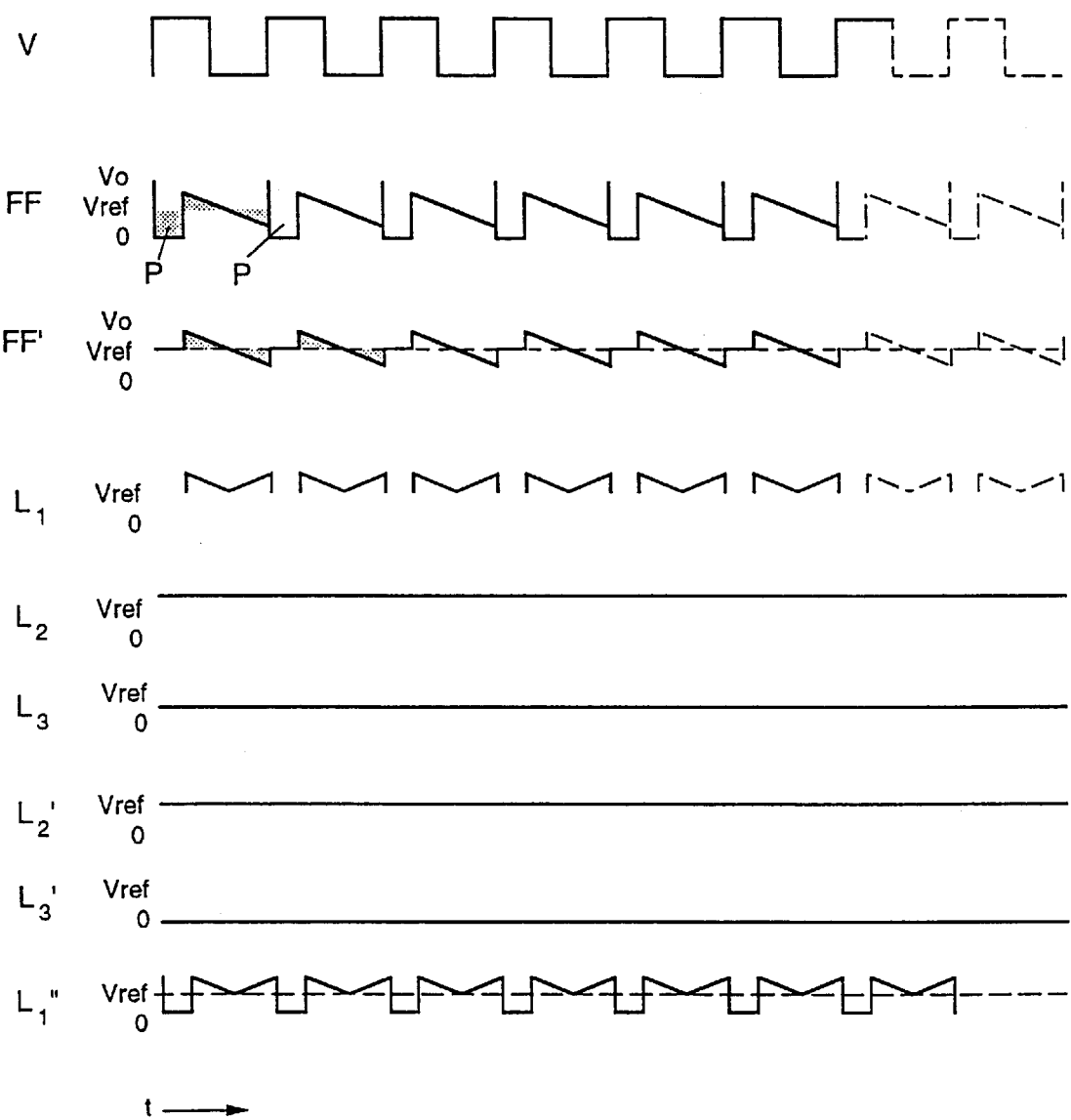
FIG. 5B shows waveform diagrams to illustrate the operation of the arrangement shown in FIG. 1.

A first row marked F in FIGS. 5A and 5B gives the six different phases which occur successively when the motor performs one complete electrical revolution. Rows A, B and C respectively give the voltage as a function of time for the nodes A, B and C of the motor. This shows, for example, that during the first and the second phase the voltage on the node A is equal to the supply voltage $V_o$. During the third phase the node A is floating and the back-emf signal is generated in the winding 2. At the beginning of the fourth phase the voltage on the node A becomes equal to the voltage on the zero point because the node A is connected to the zero-potential line 28. This situation is maintained during the fourth and the fifth phase. In the sixth phase the node A becomes floating again and another back-emf signal is generated. In the node B the same signal is generated as in the node A, the signal in the node B being 120° shifted in phase relative to the signal in the node A. Likewise, a signal generated in the node C has a 240° phase shift relative to the signal in the node A.

As already stated, the back-emf signal contains information about the position of the rotor of the motor. In order to enable all the information to be used the back-emf signal appearing in the nodes A, B and C is sampled, inverted when necessary, and combined to form a phase-error signal (FF) as shown in FIG. 5B. The phase detector 40 is thus formed by a multiplexer, known per se. For correctly combining the back-emf signals to form the phase-error signal the arrangement further comprises the decoder 48, to which the output signals of the sequencer 20 are applied. In a manner known per se the output signals of the sequencer 20 are so processed that the decoder 48 generates the switching signals $S_1, S_2, S_3$ on the lines 50, 52, 54, respectively. The switching signals $S_1$, $S_2$ and $S_3$ are applied to the phase detector 40 via the lines 50, 52 and 54. When the signal $S_1$ assumes the value 1 the signal on the line 12 (the signal on the node A) is transmitted unaltered. If the signal $S_1$ assumes the value 0, the signal on the line 12 is blocked and if the signal $S_1$ assumes the value −1, the signal on the line 12 is inverted. This also applies to the signals on the lines 14 and 16 in relation to the signals $S_2$ and $S_3$. As a result, the phase-error signal as shown in FIG. 5B is generated on the output of the phase detector 40 on the line 66. Thus, the phase detector 40 has combined all the available back-emf signals and has given them the same polarity. The advantage is that all of the available back-emf information is present in the phase-error signal (FF). If subsequently the phase-error signal is applied directly to the low-pass filter 42, any spurious components which, for example, may have been caused by the pulse-width modulator 56 and which, by way of example, have been shown in the second phase of the phase-error signal, are inhibited by the filter. Thus, the low-pass filter generates a control signal in which jitter that may have been caused by the pulse-width modulator has been inhibited. By means of a line 68 the control signal is applied to the controllable oscillator 44, which in response thereto generates the frequency signal (V), as shown in FIG. 5, on the line 38. The sequencer 20 is clocked by the frequency signal (V).

However, the phase-error signal (FF) includes flyback pulses (P) which do not contain information about the actual rotor position and which partly mask the back-emf signal. The flyback pulses start immediately after the controllable oscillator 44 has initiated a commutation. In other words, the flyback pulses for a given winding start immediately after the supply of a drive signal to the relevant winding has ceased and the winding is kept floating. The duration of the flyback pulse depends on the motor current, the self-induction effect and the back-emf. This makes it difficult to start a motor because the useful back-emf signal is then comparatively small whereas the flyback pulses are comparatively wide. As a result of this, the low-pass filter 42 generates an output signal which depends not only on the back-emf signal but also on the flyback pulses. Since the flyback pulses are independent of the instantaneous rotor position, the output signal of the low-pass filter will exhibit an error whose magnitude depends on the magnitude of the flyback pulse. The rotor position will then not be controlled correctly by the phase-locked loop.

In order to mitigate the problem of the flyback pulses the arrangement shown in FIG. 1 further comprises a masking circuit 76. The masking circuit 76 suppresses flyback pulses in the phase-error signal (FF) in order to obtain a corrected signal (FF'). In the present example the flyback pulses are even removed completely from the phase-error signal.

As stated in the foregoing, the corrected phase signal (FF') is applied to the lock detector 70 via the line 72. The lock detector comprises means, to be described hereinafter, which invert the phase-error signal at an instant at which a falling edge occurs in the frequency signal V. The lock signal $L_1$ thus obtained is shown in FIG. 5B. In the described situation, in which the multi-phase-locked loop is in the correct locking state, i.e. the frequency signal V is in phase with the back-emf signals from the windings 2, 4, 6, the lock signal $L_1$ has a d.c. component with respect to Vref. The presence of this d.c. component means that the multi-phase-locked loop is locked in phase. If the phase-locked loop is not correctly locked, i.e. if there is an unusual or no phase relationship between the frequency signal V on the one hand and the back-emf signals of the windings 2, 4, 6 on the other hand, which can occur in the case of a stalled motor or a motor running in the reverse direction, the d.c. component in the lock signal $L_1$ will disappear. The lock signal $L_1$ thus represents the incorrectly locked state of the phase-locked loop.

Figure 6:
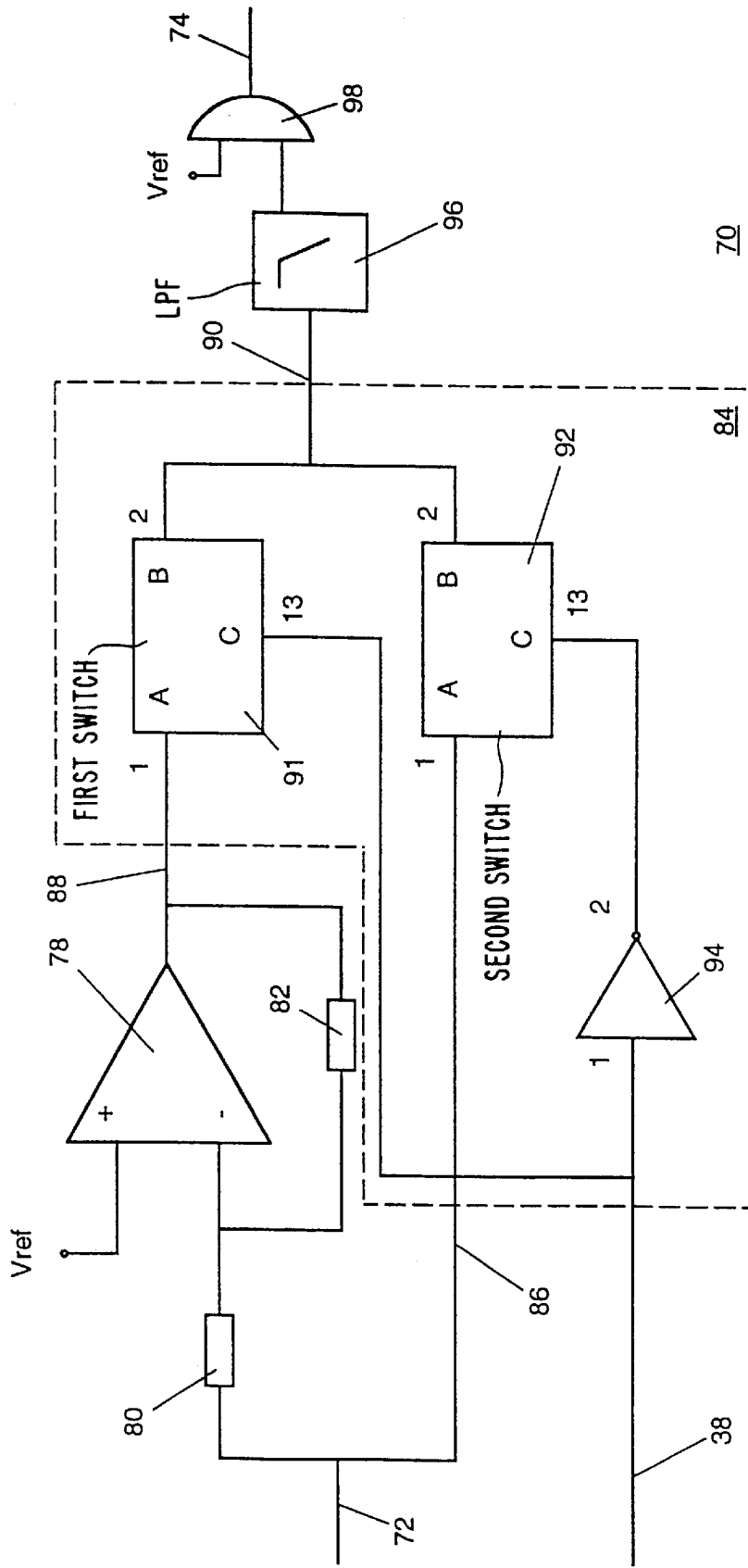
FIG. 6 shows an example of a lock detector of the arrangement shown in FIG. 1.

FIG. 6 shows a special embodiment of the lock detector 70. The lock detector 70 comprises an operational amplifier 78 arranged as an inverter circuit by means of resistors 80 and 82. The lock detector further comprises switching means 84 having a first input 86 and a second input 88, to which the phase-error signal and the inverted phase-error signal are applied, respectively. The switching means further have an output 90 connected to the first input in a first switching state and to the second input in a second switching state. In the present example the switching means 84 comprise a first controllable switch 91, arranged between the second input 88 and the output 90. The switch 91 is controlled by the frequency signal on the line 38. The switching means 84 further comprise a second controllable switch 92, arranged between the first input 86 and the output 90. The second switch 92 is controlled by the inverted frequency signal from the line 38 by means of an inverter 94, which also forms part of the switching means 84. The signal at the output 90 is applied to a low-pass filter 96. Finally, the output signal of the low-pass filter 96 is applied to a comparator 98, which in its turn generates the lock signal on the line 74. The comparator also receives the reference signal Vref.

The lock detector operates as follows. The first switch 91 is closed when a negative voltage is applied to the control input C of the first switch 91. The first switch 91 opens when a positive voltage is applied to the control input C. Similarly, the second switch 92 is closed when a negative voltage is applied to the control input C of the second switch. The second switch 92 opens when a positive voltage is applied to the control input C of the second switch 92. At the instant at which the frequency signal V is positive, the second switch 92 is closed while the first switch 91 is opened. The phase-error signal FF' is then transferred to the output 90 in non-inverted form. When subsequently the frequency signal V becomes negative, the first switch 91 is closed and the second switch is opened. This means that the inverted phase-error signal FF' is applied to the output 90. At the output 90 this yields a signal referenced $L_1$ in FIG. 5B. When the signal $L_1$ is applied to the low-pass filter 96, this results in a signal referenced $L_2$ in FIG. 5B at the output of the low-pass filter 96. In the situation as shown in FIG. 5B the multi-phase-locked loop is correctly in lock. Consequently, the signal $L_1$ will comprise a d.c. component with respect to Vref. The signal $L_2$ therefore consists of a voltage unequal to Vref. When this signal is applied to the comparator 98, this results in a signal $L_3$ unequal to 0 at the output of the comparator 98.

When the phase-locked loop is not in the correct stable state, i.e. when there is no or a deviating phase relationship between the frequency signal V and the back-emf signals of the windings 2, 4, 6 of the motor, there is not a predetermined phase relationship between the phase-error signal FF' and the frequency signal V. As a result of this, the signal $L_1$ takes the form of a voltage which alternates about Vref. This means that the signal $L_2$ is equal to Vref. In FIG. 5B this situation is marked $L_{2'}$. The signal $L_3$ is then 0. In FIG. 5B this situation is marked $L_{3'}$. Consequently, the multi-phase-locked loop is in an incorrectly locked state when the signal on the line 74 is 0 and the multi-phase-locked loop is in a correctly locked state when the signal is not equal to 0. It is to be noted that the signal $L_1$, $L_2$ as well as $L_3$ can function as a lock signal representative of the state of the multi-phase-locked loop. However, in the present example the signal $L_3$ is used as the lock signal because this signal can adopt two predetermined states, which can readily be interpreted. The comparator 98 may alternatively be replaced by an A/D converter without the operation of the lock detector being affected thereby.

The lock signal $L_3$ can be used, for example, in order to generate an error message, to increase the bandwidth of the low-pass filter 42, or to restart the arrangement when the lock signal $L_3$ represents the state in which the multi-phase-locked loop is not correctly in lock, i.e. when the lock signal $L_3$ is 0. For this purpose, the low-pass filter 42 has a variable resistor 100, which together with a capacitance 102, determines the bandwidth of the low-pass filter 42. The low-pass filter 42 further comprises a control circuit which controls the resistance value of the resistor 100. The lock signal $L_3$ is applied to the control circuit 104. When the lock signal $L_3$ is 0, the control circuit 104 will control the resistor 100 in such a manner that the resistance value of this resistor 100 decreases, as a result of which the bandwidth of the low-pass filter 42 increases. It is also possible to apply the lock signal to the speed controller 58 via the line 106. If the lock signal $L_3$ becomes 0, the speed controller 58 can, for example, cause the motor to be stopped and the arrangement to be restarted. These and other obvious uses of the lock signal are all considered to be within the scope of the invention.

For completeness' sake it is to be noted that, if desired, the masking circuit 76 may also be dispensed with. In that case the line 66 is connected directly to the line 72. The signal at the output 90 will then take the form marked $L_1''$ in FIG. 5B. Once the motor has started up, the width of the flyback pulses P in the signal $L_1''$ will decrease. As a result of this, the signal $L_1''$ will also comprise a d.c. component with respect to Vref when the phase-locked loop is correctly in lock. Obviously, the signal $L_1''$ will not comprise a d.c. component with respect to Vref when the phase-locked loop is not correctly locked. This means that a stationary motor or a motor which rotates in the reverse direction can be detected by means of the signal $L_1''$. The flyback pulses P can therefore only have such a width that the signal $L_1''$ does not provide the desired information at the instant at which a motor is being started, i.e. rotates very slowly. However, this problem can be solved by the use of a masking unit as described in the foregoing.

For completeness' sake it is to be noted also that alternatively the masking unit can be used exclusively in combination with a lock detector, or exclusively in combination with the low-pass filter 42, or as shown in FIG. 1, in combination with both the lock detector and the low-pass filter. These variants are considered to be within the scope of the invention.

Figure 7:
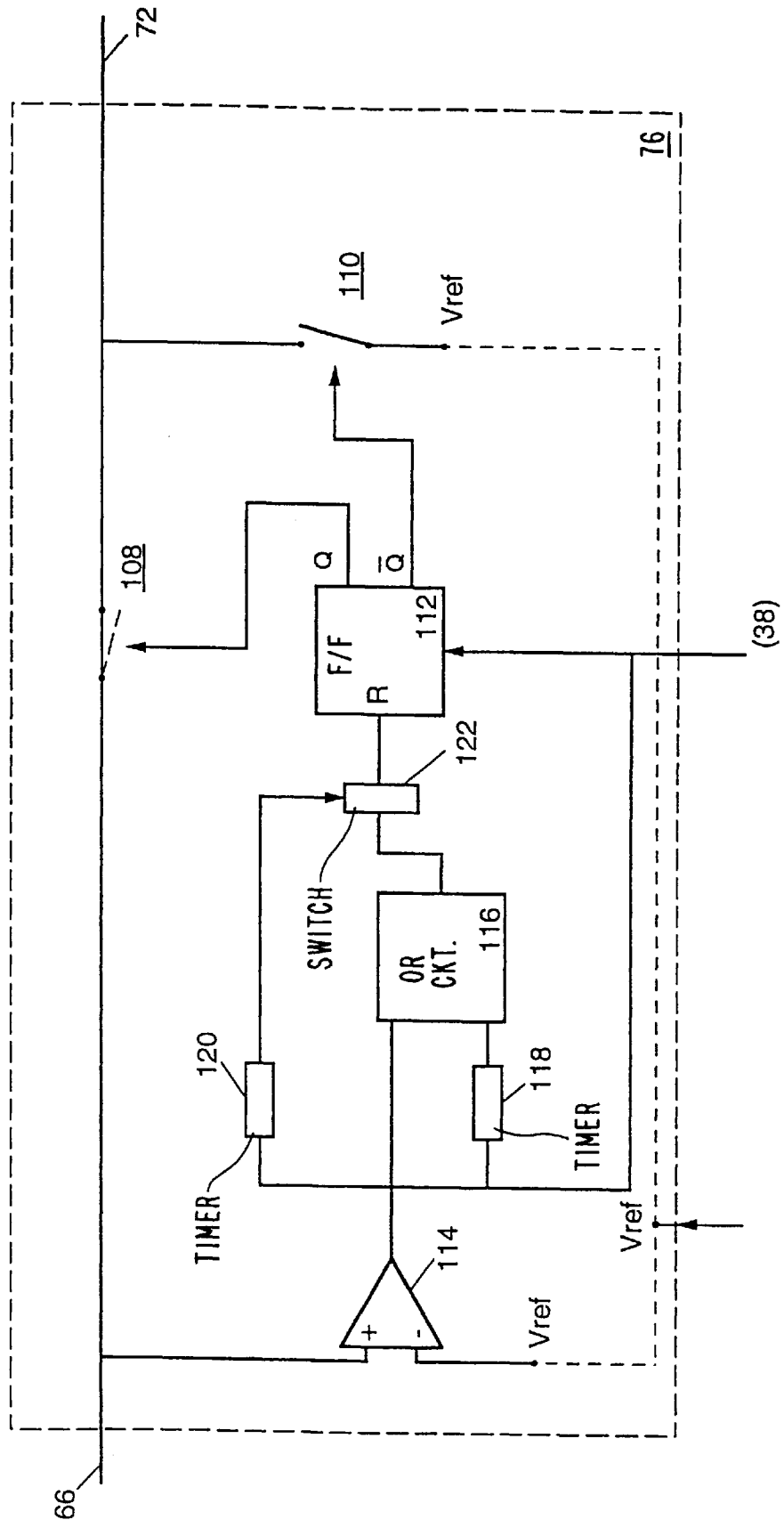
FIG. 7 shows an example of a masking circuit of the arrangement shown in FIG. 1.

Finally, for completeness' sake, an example of the masking circuit 76 will be described with reference to FIG. 7.

The masking circuit 76 comprises first controllable switching means 108 with at least one open and one closed state. In the closed state the phase-error signal on the line 66 is transferred directly, via the line 72, to the low-pass filter 42. The masking circuit further comprises second switching means 110 with at least one open and one closed state. When the second switching means 110 are in the closed state the line 72 is connected to a reference voltage (Vref). The line 72 then carries a first reference signal determined by the reference voltage, which signal is applied to the low-pass filter 42. The first and the second switching means 108, 110 are controlled, respectively, by the Q output and the $\overline{Q}$ output of a flip-flop 112. The flip-flop 112 is clocked by the output signal of the oscillator on the line 38. The masking circuit further comprises a detection circuit in the form of a comparator 114 having a first input connected to the line 66 and having a second input to which a direct voltage is applied. Thus, a second reference signal is applied to the second input, which in the present example is identical to the first reference signal. The output of the comparator 114 is connected to the input of an OR-operator circuit 116. The frequency signal on the line 38 is also applied to a first timer 118 and a second timer 120. The output of the first timer 118 is connected to a second input of the OR-operator circuit 116. The output of the second timer 120 is connected to third switching means 122 in order to control these switching means. The output of the OR-operator circuit 116 is connected to the input of the flip-flop 112 via the third switching means 122.

The masking circuit 76 operates as follows. As soon as the oscillator 44 initiates a commutation the flip-flop is reset via the line 38. This means that the flip-flop controls the first switching means 108 so as to open them and the second switching means 110 so as to close them. The flip-flop thus forms inter alia a starting circuit for starting the inhibition of the back-emf signal. As a result, the first reference signal, which in this case is formed by the reference voltage Vref, is applied to the input of the low-pass filter 42 and the lock detector 20. In the present example, the reference voltage Vref is equal to half the supply voltage $V_o$. As long as a flyback pulse appears on the line 66, the voltage on this line will be approximately 0. However, as soon as the flyback pulse ceases, the voltage on the line 66 will increase. At the instant at which the voltage on the line 66 is equal to Vref the comparator 114 will generate an output signal equal to 0. When it is assumed that the third switching means 122 are closed, this results in the flip-flop being set to another state, causing the first switching means 108 to be closed and the second switching means 110 to be opened. As a result of this, the phase-error signal on the line 66 is no longer interrupted and is applied to the input of the low-pass filter 42 and the lock detector 76 via the line 72.

The initiation of a commutation by the oscillator 44 also starts the first timer 118. A feature of the first timer 118 is that this timer supplies a signal which is not zero at an instant that this timer is started. The timer 118 maintains this signal until a predetermined minimum period has expired. When it is assumed again that the third switching means are closed, this means that the flip-flop remains in its original state for at least said minimum period, so that the first switching means 108 remain open during this minimum period and the second switching means 110 remain closed during this minimum period. As a result of internal delays in the arrangement 1 the actual commutation, i.e. the response of the inverter to the frequency signal from the oscillator will appear slightly later. This gives rise to disturbances in the sampled back-emf signal. Since all these disturbances occur within said minimum period, they will not be applied to the low-pass filter. At the end of the predetermined minimum period the output signal of the first timer will go to zero. From this instant, the state of the flip-flop will consequently be dependent on the output signal of the comparator 114.

The second timer 120 is also reset at an instant at which the oscillator initiates a commutation. From this instant, the output signal of the second timer will assume a non-zero value. The third switching means 122 are closed as long as the output signal of the second timer is not zero. However, the third switching means 122 will be opened in that the output signal of the second timer becomes zero after a predetermined maximum period. This maximum period is longer than said minimum period and shorter than the length of the free period in which the emf signal can occur. If the flyback pulse does not appear or is not detected by the comparator for any reason whatsoever, the second timer will ensure that the third switching means are opened after expiry of the maximum period. As a result, the first switching means 108 will be closed again and the second switching means 110 will be opened via the flip-flop 112. Since the duration of a period in which a back-emf signal can occur depends on the motor speed, it is preferred to make said maximum period of the second timer 120 dependent on the instantaneous speed of the motor. The maximum period can be smaller as the motor speed is higher. This can be achieved, for example, by setting the timer 120 by means of the frequency signal generated on the line 38 by the oscillator 44.

In the present example the low-pass filter comprises an integrator, which integrates the difference between the phase-error signal and a third reference signal in order to obtain the control signal applied to the oscillator 44. In this example, the third reference signal again consists of the reference voltage Vref. This has the advantage that no difference voltage appears at the input of the integrator when the masking circuit feeds the first reference signal to the low-pass filter. However, it will be evident that it is also possible to use other types of low-pass filters, such as for example passive RC filters.

It is emphasized that the scope of the invention is by no means limited to the example described above.

Figure 8:
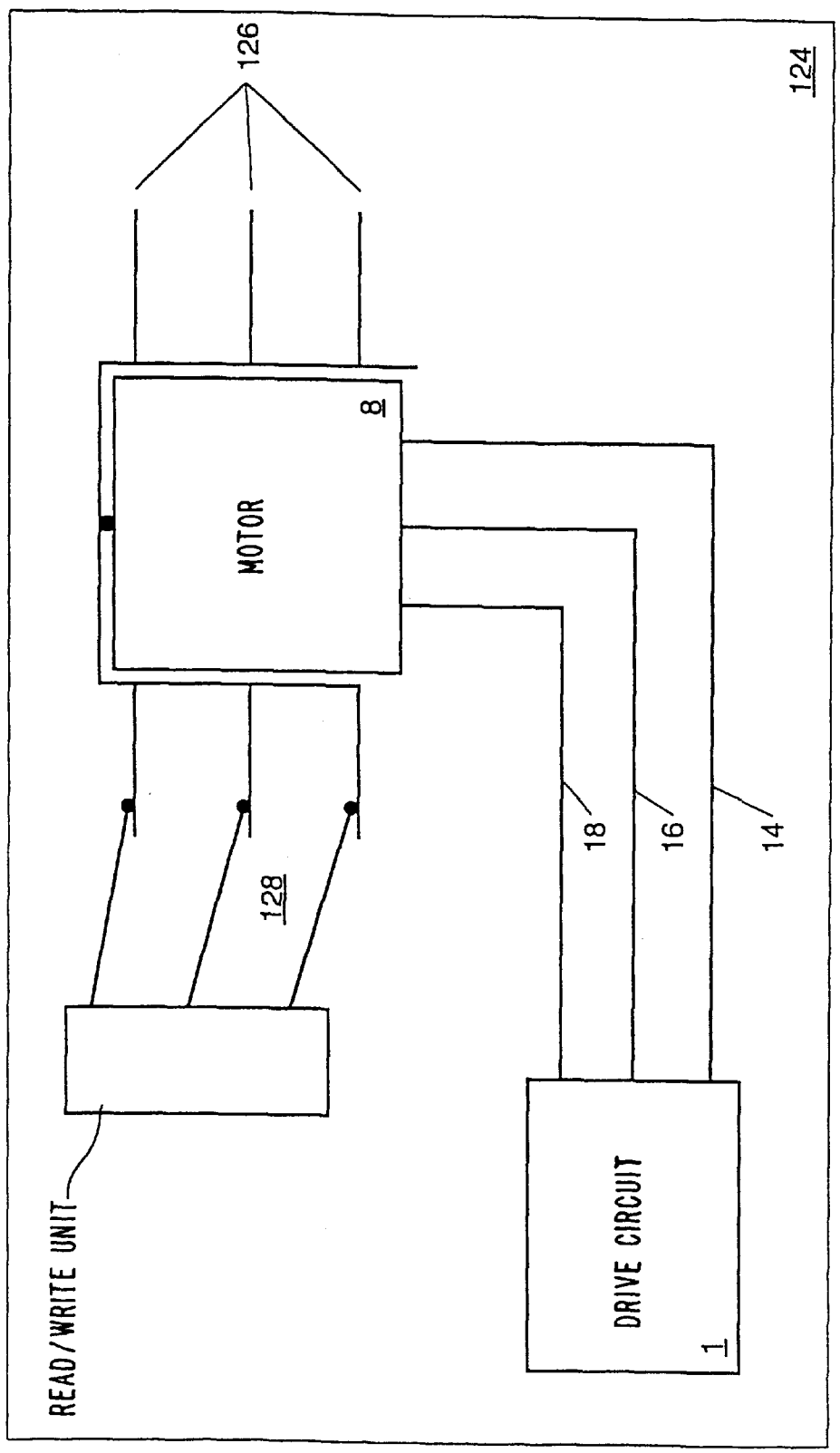
FIG. 8 shows an example of a disk-drive including an arrangement as shown in FIG. 1.

On the basis of the same principles the invention can also be used for 2-phase, 3-phase, 4-phase, 5-phase, . . . , n-phase motors. Besides, the invention is not limited to its use in conjunction with three-phase motors having windings arranged in a Y-configuration. Other configurations are also conceivable. A drive arrangement comprising a multi-phase d.c. motor and an arrangement in accordance with the invention is preferably used in disk drives, such as computer hard-disk drives, CD-ROM drives, floppy-disk drives and the like. FIG. 8 shows an example of such a disk drive 124. The disk drive 124 comprises an information carrier in the form of an assembly of, in the present example three, magnetizable disks 126. The disk drive further comprises a read and write unit 128 for writing digital information on the rotatable disks 126 and for reading digital information from the disks 126. The rotatable disks 126 are driven by the arrangement 1 and the motor 8 as shown in FIG. 1. The advantage of the disk drive 124 is that the start-up of the disk drive 124 is very reliable. This means that there is no risk that the disk drive 124 begins to rotate in an undesired direction upon starting while nevertheless the disk drive will start up very rapidly. This is achieved as a result of a combination of the phase-locked loop and the masking circuit 76. If for some reason the disk drive begins to rotate in a wrong direction or stalls, this is detected by the lock detector and appropriate measures can be taken. Therefore, the disk drive in accordance with the invention will operate very reliably.

However, the arrangement is also suitable for use in conjunction with other drives. All these variants are considered to fall within the scope of the invention.

I claim:

1. An arrangement for generating drive signals to be supplied to a plurality of windings of a multi-phase d.c. motor, comprising: a multi-phase inverter which supplies the drive signals to the windings of the motor such that said windings are recurrently energized by the drive signals in a given sequence, at least one winding not being supplied with a drive signal at least during predetermined free periods (Pv); a phase detector which, under control of said multi-phase inverter, during a plurality of said free periods in which no drive signal is applied to said windings, multiplexes the back-emf signals of said windings in order to obtain a phase-error signal; a first low-pass filter generates a control signal dependent upon the phase-error signal; and a controllable oscillator generates a frequency signal (V) whose frequency depends on the control signal, the timing with which the multi-phase inverter supplies the drive signals to the windings being dependent on the frequency signal, a phase-locked loop being formed by the multi-phase inverter, phase detector, first low-pass filter and oscillator, and a lock detector which determines whether the back-emf signals are or are not in phase with the frequency signal (V), which is effected on the basis of information about the frequency and phase of the phase-error signal and information about the frequency and phase of the frequency signal.

2. An arrangement as claimed in claim 1, wherein the lock detector processes the phase-error signal and the frequency signal in combination in order to determine whether the back-emf signals are or are not in phase with the frequency signal.

3. An arrangement as claimed in claim 1, wherein the lock detector generates a lock signal which is representative of whether the back-emf signals are in phase or not in phase with the frequency signal.

4. An arrangement as claimed in claim 3, wherein the lock detector comprises means for multiplying the phase-error signal and the frequency signal by one another.

5. An arrangement as claimed in claim 4, wherein the lock detector comprises means for alternately inverting and non-inverting the phase-error signal in the rhythm of the frequency signal in order to obtain the lock signal.

6. An arrangement as claimed in claim 5, characterized in that the lock detector comprises an inverter circuit for inverting the phase-error signal and switching means which are switched between a first switching state and a second switching state by the frequency signal, the switching means transferring the phase-error signal in the first state and the inverted phase-error signal, generated by the inverter circuit, in the second switching state.

7. An arrangement as claimed in claim 6, characterized in that the switching means have a first input and a second input to which the phase-error signal and the inverted phase-error signal are applied, respectively, and an output connected to the first input in the first switching state and to the second input in the second switching state.

8. An arrangement as claimed in claim 6, characterized in that the lock detector further comprises a second low-pass filter to which is applied an output signal from the output of the switching means.

9. An arrangement as claimed in claim 8, characterized in that the lock detector further comprises a comparator or an A/D converter to which the output signal of the second low-pass filter is applied in order to obtain a digital lock signal.

10. An arrangement as claimed in claim 6, wherein the switching means alternately switch between the first switching state and the second switching state at a frequency and phase corresponding to the frequency and phase of the frequency signal.

11. An arrangement as claimed in claim 3, which further the arrangement comprises means controlled by the lock signal, for restarting the arrangement, for generating an error signal, or for increasing the bandwidth of the first low-pass filter when the lock signal represents the state in which the back-emf signals are not in phase with the frequency signal.

12. An arrangement as claimed in claim 1, which further comprises a masking circuit for temporarily inhibiting the further processing of the phase-error signal by the first low-pass filter and/or the lock circuit, at least during the presence of a flyback pulse in the phase-error signal, thereby inhibiting the processing of the flyback pulses present in the phase-error signal.

13. An arrangement as claimed in claim 12, characterized in that the masking circuit further comprises switching means for interrupting the supply of the phase-error signal to the first low-pass filter and/or the lock circuit to inhibit the further processing of flyback pulses.

14. An arrangement as claimed in claim 13, characterized in that the masking circuit supplies a first reference signal to the first low-pass filter and/or the lock circuit when the supply of the phase-error signal to the first low-pass filter and/or the lock circuit is interrupted.

15. A drive arrangement comprising a multi-phase d.c. motor and an arrangement as claimed in claim 1 wherein the multi-phase inverter has at least first and second output lines connected to first and second motor windings, respectively, to supply drive signals to said windings.

16. A system for storing and/or reproducing information on/from an information carrier, comprising a head for reading and/or writing information from/on the information carrier and a drive arrangement as claimed in claim 15 coupled to the multi-phase D.C. motor for relatively moving the head with respect to the information carrier.

17. An arrangement as claimed in claim 1 wherein the lock detector comprises; first and second inputs which receive the phase-error signal and the frequency signal, respectively, an inverter circuit for inverting the phase-error signal and switching means which are switched between a first switching state and a second switching state by the frequency signal, the switching means transferring the phase-error signal in the first state and the inverted phase-error signal, generated by the inverter circuit, in the second switching state, and the switching means alternately switch between the first switching state and the second switching state at a frequency and phase corresponding to the frequency and phase of the frequency signal.

18. An arrangement as claimed in claim 17 wherein said first input of the lock detector receives the phase-error signal via a masking circuit coupled between the phase-detector and the first input of the lock detector.

19. An arrangement as claimed in claim 1 wherein the lock detector includes means for producing a lock signal having a DC voltage component when the back-emf signals are in phase with the frequency signal.

20. An arrangement as claimed in claim 1 further comprising a masking circuit for inhibiting passage of the phase-error signal to the low-pass filter and/or the lock circuit at least during the presence of a flyback pulse in the phase-error signal, wherein the masking circuit includes first timing means that sets a minimum time period for inhibiting the passage of the phase-error signal and second timing means that sets a maximum time period to ensure passage of the phase-error signal at a time subsequent to its inhibition, wherein the maximum period of the second timing means is longer than said minimum time period and is shorter than said free period.

21. An arrangement as claimed in claim 1 wherein the motor is a three-phase motor and the inverter is a three-phase inverter, and the lock detector receives the phase-error signal and the frequency signal and determines whether the back-emf signals and the frequency signal are in phase, whether there is an undesired phase relationship therebetween or no phase relationship at all between said signals.

22. An arrangement as claimed in claim 1 wherein the lock circuit is non-oscillatory and is connected in a part of the arrangement separate from the phase-locked loop.

\* \* \* \* \*

Disclaimer 5,949,203—Henricus C. J. Büthker, Mierlo, (NL). ARRANGEMENT FOR GENERATING DRIVE SIGNALS FOR A MULTI-PHASE D.C. MOTOR, LOCK DETECTOR, DRIVE ARRANGEMENT AND DISK DRIVE. Patent dated September 7, 1999. Disclaimer filed March 28, 2008, by the assignee, U.S. Philips Corporation.

Hereby enters this disclaimer to all claims of said patent.

(*Official Gazette October 7, 2008*)